United States Patent
Pallerla et al.

(10) Patent No.: US 11,703,979 B2
(45) Date of Patent: Jul. 18, 2023

(54) POWER SAVING FOR LARGE-AREA SENSOR

(71) Applicant: QUALCOMM Incorporated, San Diego, CA (US)

(72) Inventors: Rakesh Pallerla, Hyderabad (IN); Naga Chandan Babu Gudivada, Hyderabad (IN); Kritpal Singh Dhindhsa, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/249,352

(22) Filed: Feb. 26, 2021

(65) Prior Publication Data

US 2022/0276758 A1 Sep. 1, 2022

(51) Int. Cl.
*G06F 3/041* (2006.01)
*G06V 40/13* (2022.01)
*G06F 3/04886* (2022.01)

(52) U.S. Cl.
CPC ...... *G06F 3/04166* (2019.05); *G06F 3/04886* (2013.01); *G06V 40/13* (2022.01); *G06F 2203/04803* (2013.01)

(58) Field of Classification Search
CPC ............. G06F 3/04166; G06F 3/04886; G06F 2203/04803; G06V 40/13
See application file for complete search history.

(56) References Cited

U.S. PATENT DOCUMENTS

| | | | |
|---|---|---|---|
| 8,797,287 B2 | 8/2014 | Sundara-Rajan et al. | |
| 2013/0234982 A1* | 9/2013 | Kang | G06F 3/04186 345/174 |
| 2015/0268807 A1* | 9/2015 | Truong | G06F 3/0484 715/800 |
| 2015/0331508 A1 | 11/2015 | Nho et al. | |
| 2018/0157893 A1* | 6/2018 | Lee | G06V 10/22 |
| 2020/0034522 A1 | 1/2020 | Kompala et al. | |
| 2021/0405766 A1* | 12/2021 | Nguyen | G06F 3/04886 |

OTHER PUBLICATIONS

International Search Report and Written Opinion—PCT/US2022/012638—ISA/EPO—dated Apr. 25, 2022.

* cited by examiner

*Primary Examiner* — Jonathan A Boyd
(74) *Attorney, Agent, or Firm* — QUALCOMM Incorporated

(57) ABSTRACT

Some disclosed methods involve controlling, via a control system of an apparatus, a touch sensor system to obtain touch sensor data in a touch sensor system active area of the apparatus. Some disclosed methods involve controlling, via the control system, a fingerprint sensor system of the apparatus to obtain fingerprint sensor data in a fingerprint sensor system active area of the apparatus. Some disclosed methods involve determining, via the control system and based on the touch sensor data, n touch locations corresponding to n last user touches and controlling, via the control system, a size of the touch sensor system active area based, at least in part, on the n touch locations.

39 Claims, 7 Drawing Sheets

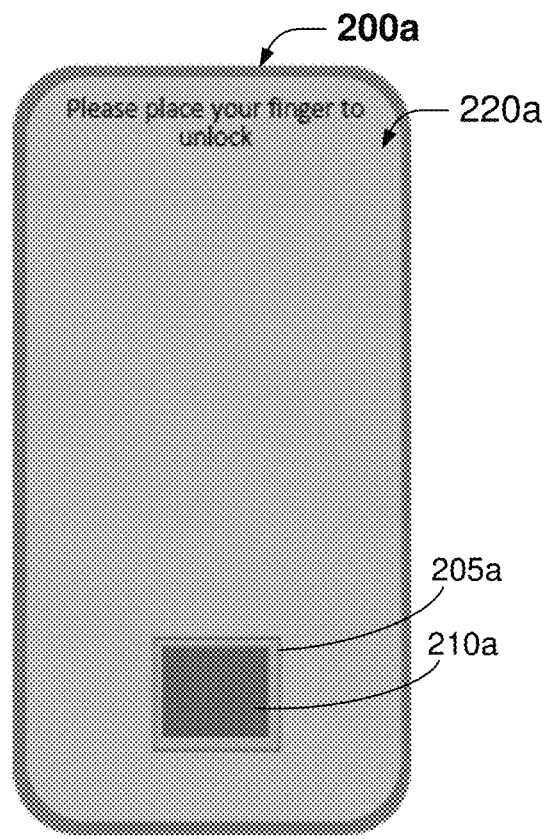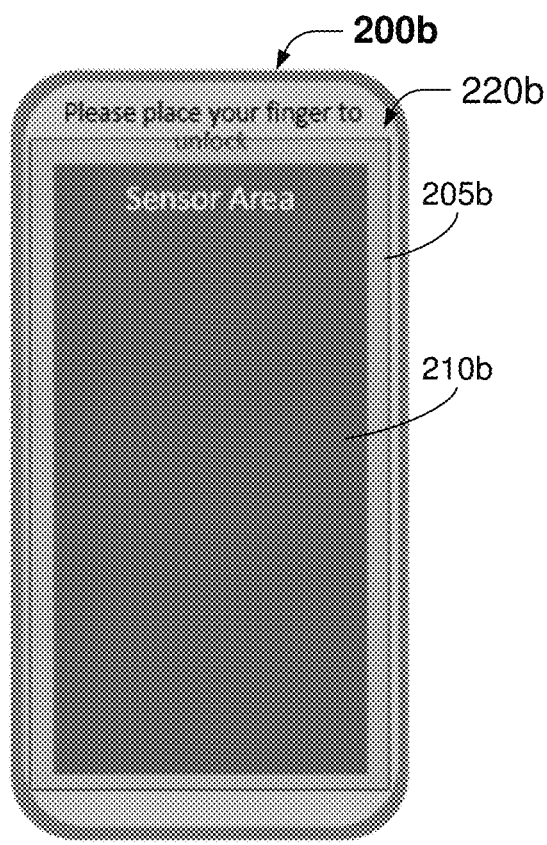
Figure 2A
Figure 2B

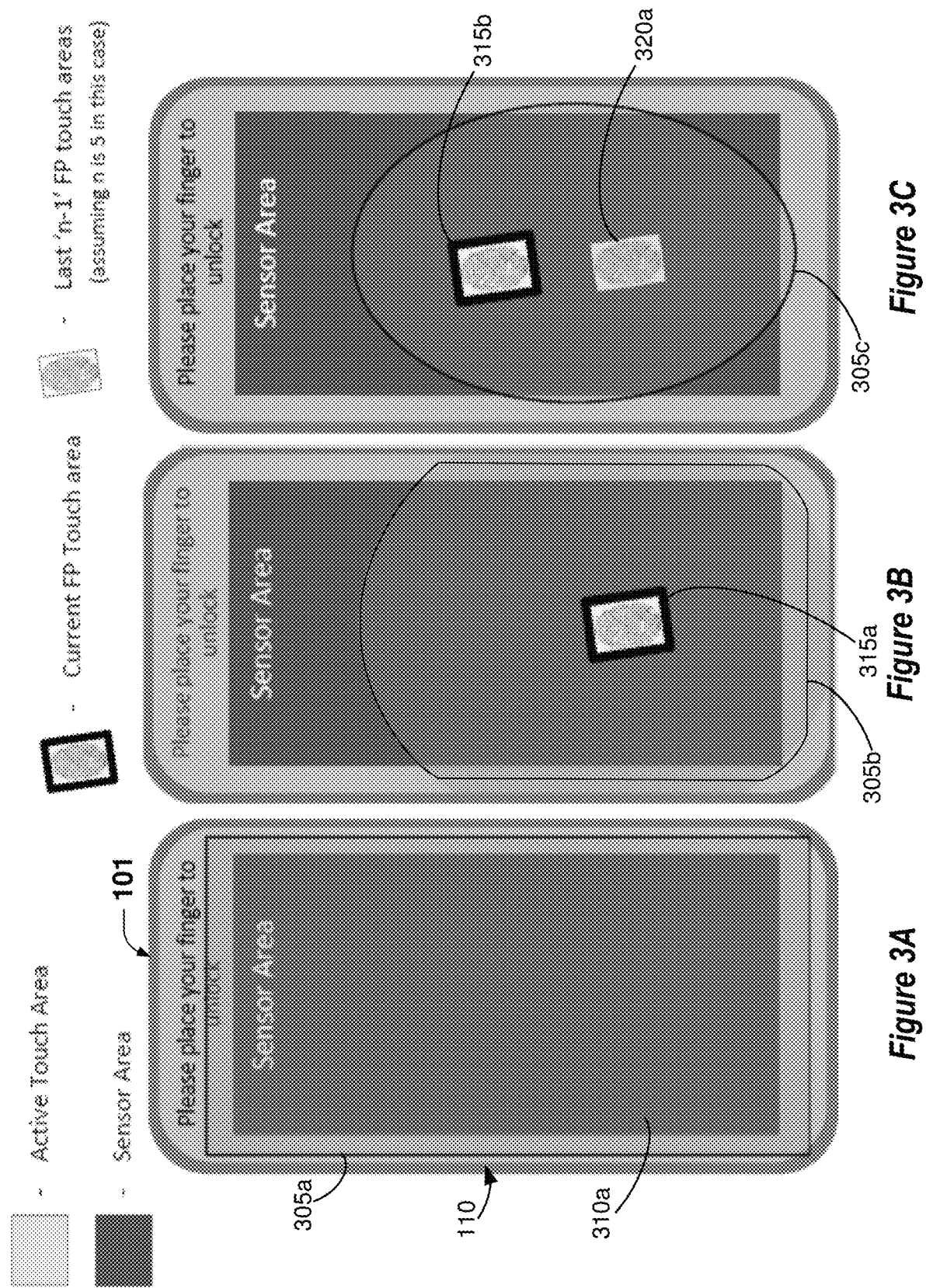

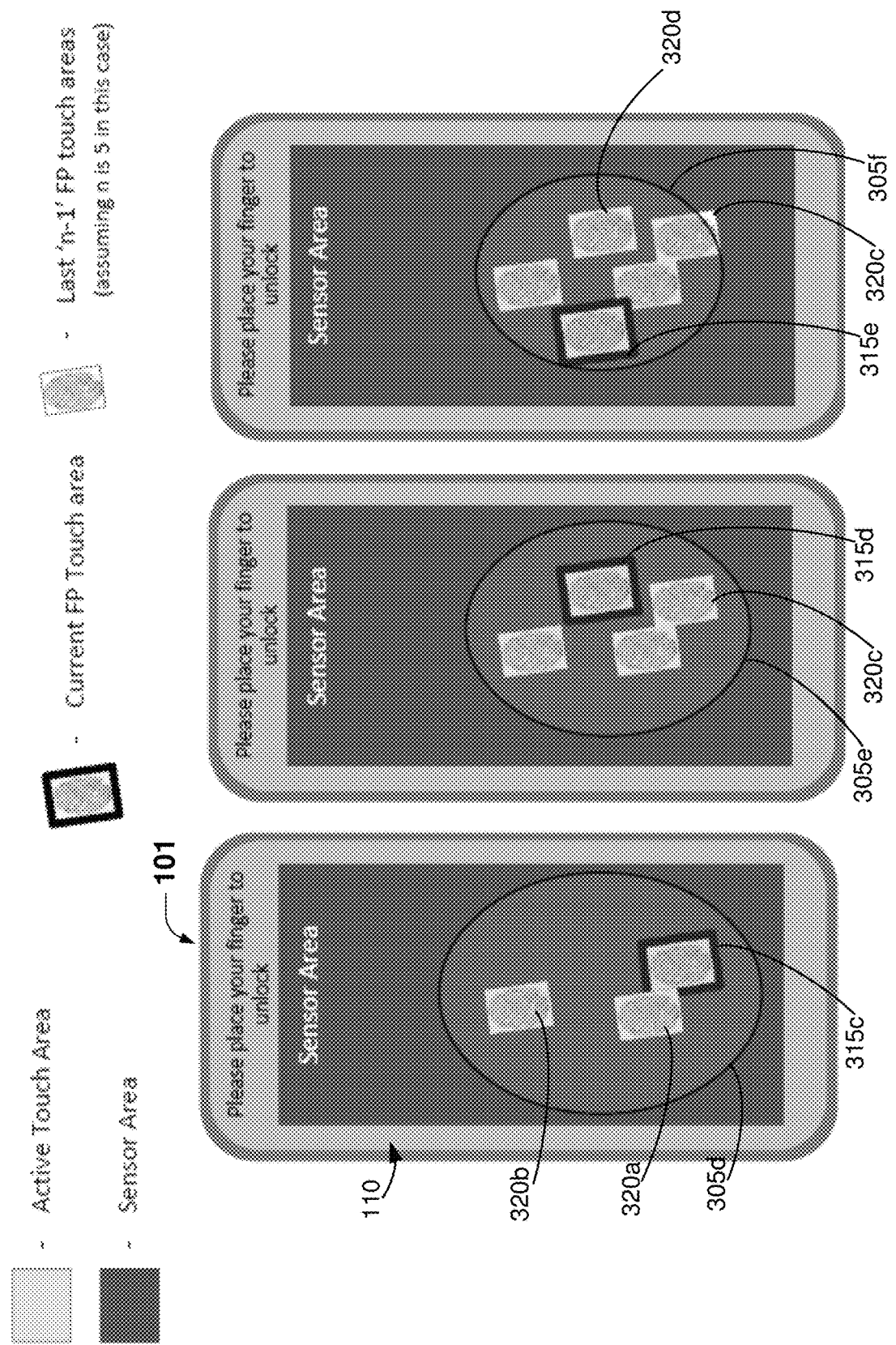

POWER SAVING FOR LARGE-AREA SENSOR

TECHNICAL FIELD

This disclosure relates generally to fingerprint sensor devices and related methods, including but not limited to touch sensor systems and fingerprint sensor systems, and methods for using such systems.

DESCRIPTION OF THE RELATED TECHNOLOGY

Touch sensor systems are commonly featured in a variety of devices. Biometric authentication, including but not limited to fingerprint-based authentication, can be an important feature for controlling access to devices, secured areas, etc. Although some existing touch sensor systems and fingerprint sensor systems provide satisfactory performance under some conditions, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a touch sensor system, a fingerprint sensor system and a control system configured for communication with (e.g. electrically or wirelessly coupled to) the touch sensor system and the fingerprint sensor system. In some examples, the control system may include a memory, whereas in other examples the control system may be configured for communication with a memory that is not part of the control system. According to some examples, the apparatus may be integrated into a mobile device. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured for controlling the touch sensor system to obtain touch sensor data in a touch sensor system active area of the apparatus and for controlling the fingerprint sensor system to obtain fingerprint sensor data in a fingerprint sensor system active area of the apparatus. In some examples, the control system may be configured for determining, based on the touch sensor data, n touch locations corresponding to n last user touches and for controlling a size of the touch sensor system active area based, at least in part, on the n touch locations.

In some examples, the control system may be configured for setting a number of last user touches to zero after an apparatus boot-up process. According to some such examples, the control system may be configured for setting the touch sensor system active area to an entire touch sensor area upon determining that the number of last user touches is zero. In some such examples, the control system may be configured for setting the touch sensor system active area to a first touch sensor area that is smaller than the entire touch sensor area upon determining that the number of last user touches is one. According to some such examples, the control system may be configured for setting the touch sensor system active area to a second touch sensor area that is smaller than the first touch sensor area upon determining that the number of last user touches is two. In some such examples, the control system may be configured for setting the touch sensor system active area to a third touch sensor area that is smaller than the second touch sensor area upon determining that the number of last user touches is three.

According to some examples, the control system may be configured for determining a shape that encompasses the n touch locations and for setting the touch sensor system active area to correspond with the shape. In some examples, the control system may be configured for determining a shape that encompasses at least a threshold portion of the n touch locations and for setting the touch sensor system active area to correspond with the shape.

In some examples, the control system may be configured for determining a touch probability for each tile of a plurality of touch sensor tiles of the touch sensor system, to determine a plurality of touch probabilities. Each touch sensor tile of the plurality of touch sensor tiles may include one or more touch sensor pixels. The touch probability may be a probability that a next user touch will be on a particular touch sensor tile. In some such examples, the touch probability for each touch sensor tile may be based on a distance from each of the n touch locations to each touch sensor tile. In some such examples, the control system may be configured for controlling the size of the touch sensor system active area based, at least in part, on the plurality of touch probabilities. In some such examples, the control system may be configured for identifying touch sensor tiles having a touch probability greater than a touch probability threshold, to determine identified touch sensor tiles. In some such examples, the control system may be configured for finding an encompassing shape that will encompass at least a threshold percentage of identified touch sensor tiles and for determining the touch sensor system active area based on the encompassing shape.

According to some examples, the control system may be configured for controlling the fingerprint sensor system to obtain fingerprint sensor data in each of the n touch locations. In some such examples, the control system may be configured for controlling the fingerprint sensor system to obtain the fingerprint sensor data in each of the n touch locations after receiving touch sensor data corresponding to user touches in each of the n touch locations. In some such examples, the control system may be configured for controlling the fingerprint sensor system active area to correspond with each of the n touch locations after receiving the touch sensor data corresponding to user touches in each of the n touch locations.

Other innovative aspects of the subject matter described in this disclosure may be implemented in a method. In some examples, the method may involve controlling, via a control system of an apparatus, a touch sensor system of the apparatus to obtain touch sensor data in a touch sensor system active area of the apparatus. In some such examples, the control system may be configured for controlling, via the control system, a fingerprint sensor system of the apparatus to obtain fingerprint sensor data in a fingerprint sensor system active area of the apparatus. In some such examples, the control system may be configured for In some such examples, the control system may be configured for determining, via the control system and based on the touch sensor data, n touch locations corresponding to n last user touches. In some such examples, the control system may be configured for controlling, via the control system, a size of the touch sensor system active area based, at least in part, on the n touch locations.

In some examples, the method may involve setting a number of last user touches to zero after an apparatus boot-up process. In some such examples, the method may involve setting the touch sensor system active area to an entire touch sensor area upon determining that the number of last user touches is zero. In some such examples, the method may involve setting the touch sensor system active area to a first touch sensor area that is smaller than the entire touch sensor area upon determining that the number of last user touches is one. In some such examples, the method may involve setting the touch sensor system active area to a second touch sensor area that is smaller than the first touch sensor area upon determining that the number of last user touches is two. In some such examples, the method may involve setting the touch sensor system active area to a third touch sensor area that is smaller than the second touch sensor area upon determining that the number of last user touches is three.

According to some examples, the method may involve determining a shape that encompasses the n touch locations and setting the touch sensor system active area to correspond with the shape. In some examples, the method may involve determining a shape that encompasses at least a threshold portion of the n touch locations and setting the touch sensor system active area to correspond with the shape.

In some examples, the method may involve determining a touch probability for each tile of a plurality of touch sensor tiles of the touch sensor system, to determine a plurality of touch probabilities. Each touch sensor tile of the plurality of touch sensor tiles may include one or more touch sensor pixels. The touch probability may be a probability that a next user touch will be on a particular touch sensor tile. In some such examples, the method may involve controlling the size of the touch sensor system active area based, at least in part, on the plurality of touch probabilities. In some such examples, the touch probability for each touch sensor tile may be based on a distance from each of the n touch locations to each touch sensor tile. In some such examples, the method may involve identifying touch sensor tiles having a touch probability greater than a touch probability threshold, to determine identified touch sensor tiles, finding an encompassing shape that will encompass at least a threshold percentage of identified touch sensor tiles and determining the touch sensor system active area based on the encompassing shape.

According to some examples, the method may involve controlling the fingerprint sensor system to obtain fingerprint sensor data in each of the n touch locations. In some such examples, the method may involve controlling the fingerprint sensor system to obtain the fingerprint sensor data in each of the n touch locations after receiving touch sensor data corresponding to user touches in each of the n touch locations. In some such examples, the method may involve controlling the fingerprint sensor system active area to correspond with each of the n touch locations after receiving the touch sensor data corresponding to user touches in each of the n touch locations.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform a method.

In some examples, the method may involve controlling, via a control system of an apparatus, a touch sensor system of the apparatus to obtain touch sensor data in a touch sensor system active area of the apparatus. In some such examples, the control system may be configured for controlling, via the control system, a fingerprint sensor system of the apparatus to obtain fingerprint sensor data in a fingerprint sensor system active area of the apparatus. In some such examples, the control system may be configured for In some such examples, the control system may be configured for determining, via the control system and based on the touch sensor data, n touch locations corresponding to n last user touches. In some such examples, the control system may be configured for controlling, via the control system, a size of the touch sensor system active area based, at least in part, on the n touch locations.

In some examples, the method may involve setting a number of last user touches to zero after an apparatus boot-up process. In some such examples, the method may involve setting the touch sensor system active area to an entire touch sensor area upon determining that the number of last user touches is zero. In some such examples, the method may involve setting the touch sensor system active area to a first touch sensor area that is smaller than the entire touch sensor area upon determining that the number of last user touches is one. In some such examples, the method may involve setting the touch sensor system active area to a second touch sensor area that is smaller than the first touch sensor area upon determining that the number of last user touches is two. In some such examples, the method may involve setting the touch sensor system active area to a third touch sensor area that is smaller than the second touch sensor area upon determining that the number of last user touches is three.

According to some examples, the method may involve determining a shape that encompasses the n touch locations and setting the touch sensor system active area to correspond with the shape. In some examples, the method may involve determining a shape that encompasses at least a threshold portion of the n touch locations and setting the touch sensor system active area to correspond with the shape.

In some examples, the method may involve determining a touch probability for each tile of a plurality of touch sensor tiles of the touch sensor system, to determine a plurality of touch probabilities. Each touch sensor tile of the plurality of touch sensor tiles may include one or more touch sensor pixels. The touch probability may be a probability that a next user touch will be on a particular touch sensor tile. In some such examples, the method may involve controlling the size of the touch sensor system active area based, at least in part, on the plurality of touch probabilities. In some such examples, the touch probability for each touch sensor tile may be based on a distance from each of the n touch locations to each touch sensor tile. In some such examples, the method may involve identifying touch sensor tiles having a touch probability greater than a touch probability threshold, to determine identified touch sensor tiles, finding an encompassing shape that will encompass at least a threshold percentage of identified touch sensor tiles and determining the touch sensor system active area based on the encompassing shape.

According to some examples, the method may involve controlling the fingerprint sensor system to obtain fingerprint sensor data in each of the n touch locations. In some such examples, the method may involve controlling the fingerprint sensor system to obtain the fingerprint sensor data in each of the n touch locations after receiving touch sensor data corresponding to user touches in each of the n touch locations. In some such examples, the method may involve controlling the fingerprint sensor system active area to correspond with each of the n touch locations after receiving the touch sensor data corresponding to user touches in each of the n touch locations.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

FIG. 2A shows an example of an active touch area and an example of an active fingerprint sensor area according to one current mobile device implementation.

FIG. 2B shows an example of an active touch area and an example of an active fingerprint sensor area according to one possible future mobile device implementation that is based on the same logic underlying the example of FIG. 2A.

FIG. 3A shows an example of an apparatus that has been powered on (also referred to herein as being booted up, or as having undergone a boot-up process), but has not yet been unlocked since being powered on.

FIG. 3B shows an example of the apparatus of FIG. 3A after the apparatus has been unlocked one time since being powered on.

FIG. 3C shows an example of the apparatus of FIG. 3B after the apparatus has been unlocked an additional time since being powered on.

FIG. 3D shows an example of the apparatus of FIG. 3C after the apparatus has been unlocked an additional time since being powered on.

FIG. 3E shows an example of the apparatus of FIG. 3D after the apparatus has been unlocked an additional time since being powered on.

FIG. 3F shows an example of the apparatus of FIG. 3E after the apparatus has been unlocked an additional time since being powered on.

FIG. 3G shows an example of the apparatus of FIG. 3F after the apparatus has been unlocked an additional time since being powered on.

FIG. 3H shows an example of the apparatus of FIG. 3G after the apparatus has been unlocked an additional time since being powered on.

FIG. 3I shows an example of the apparatus of FIG. 3H after the apparatus has been unlocked an additional time since being powered on.

DETAILED DESCRIPTION

Figure 1:
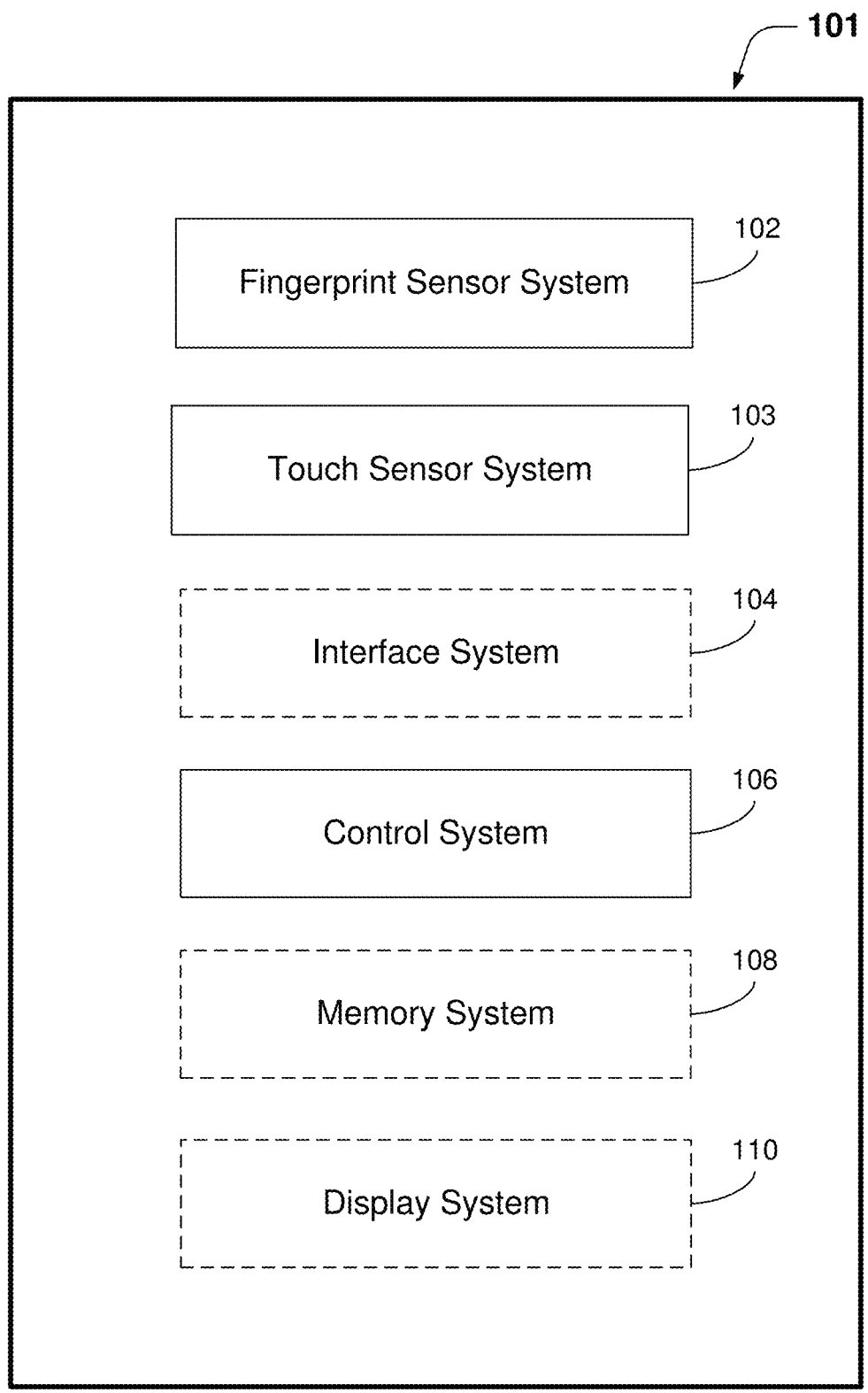
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

The use of fingerprint sensors for authentication is now commonplace. (As used herein, the term "finger" may refer to any digit, including a thumb. Accordingly, a thumbprint will be considered a type of "fingerprint.") In some examples, a control system of an apparatus will obtain a target object location (e.g., a digit location) for fingerprint sensor scanning via input from a touch sensor system.

In some implementations, at least a portion of a device's touch sensor system (e.g., a portion corresponding with the fingerprint sensor) will remain active or "on" even when the apparatus is locked and/or in a sleep state. If the fingerprint sensor area occupies a relatively small portion of the overall touch sensor system area, the power consumption caused by an "always on" touch sensor system portion can be mitigated. For example, the 4 mm×9 mm or 8 mm×8 mm fingerprint sensors that are currently deployed by the present assignee occupy a relatively small portion of the overall touch sensor system area of a cell phone, which generally corresponds to a display area of the cell phone. However, some large-format fingerprint sensor systems under development by the present assignee may extend underneath a substantial portion (e.g., half or more) of a cell phone display area. If a corresponding portion of a of the touch sensor system will remain active even when the apparatus is locked and/or in a sleep state, the power consumption caused by an "always on" touch sensor system portion will increase substantially.

Some disclosed methods involve dynamically changing the size of the touch sensor system active area. Some such methods involve dynamically changing the size of the touch sensor system active area based, at least in part, on recent touch sensor data received from a touch sensor system. In some examples, the size of the touch sensor system active area may be based, at least in part, on n touch locations corresponding to n last user touches. A maximum value for the number n may, for example, be configurable at a factory in which the apparatus is assembled, by a device vendor, and/or by an end user. According to some such examples, fingerprint sensor scanning will only be performed in a target object location.

Particular implementations of the subject matter described in this disclosure may be implemented to realize one or more of the following potential advantages. Dynamically changing the size of the touch sensor system active area can result in a substantially lower power consumption caused by an "always on" touch sensor system portion. For example, in some tests conducted by the present inventors, dynamically changing the size of the touch sensor system active area according to the five last user touch locations resulted in in approximately a 70% lower power consumption, as compared to an "always on" touch sensor system portion that corresponded to the entire fingerprint sensor area.

FIG. 1 is a block diagram that shows example components of an apparatus according to some disclosed implementations. In this example, the apparatus 101 includes a fingerprint sensor system 102, a touch sensor system 103 and a control system 106. Some implementations may include an interface system 104, a memory system 108 and/or a display system 110.

According to some examples, the fingerprint sensor system 102 may be, or may include, an ultrasonic fingerprint sensor. Alternatively, or additionally, in some implementations the fingerprint sensor system 102 may be, or may include, an optical fingerprint sensor. In some examples, an ultrasonic version of the fingerprint sensor system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the fingerprint sensor system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The fingerprint sensor system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the fingerprint sensor system 102 may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.

The touch sensor system 103 may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations that include a display system 110, the area of the touch sensor system 103 may extend over most or all of a display portion of the display system 110.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the fingerprint sensor system 102 and the touch sensor system 103. According to some examples, the control system 106 may include a dedicated component for controlling the fingerprint sensor system 102 and/or a dedicated component for controlling the touch sensor system 103. If the apparatus includes a display system 110, the control system 106 may be configured for communication with, and for controlling, the display system 110. If the apparatus includes a memory system 108 that is separate from the control system 106, the control system 106 also may be configured for communication with the memory system 108. In some implementations, functionality of the control system 106 may be partitioned between one or more controllers or processors, such as between a dedicated sensor controller and an applications processor of a mobile device.

In some examples, the memory system 108 may include one or more memory devices, such as one or more RAM devices, ROM devices, etc. In some implementations, the memory system 108 may include one or more computer-readable media, storage media and/or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and the fingerprint sensor system 102, one or more interfaces between the control system 106 and the touch sensor system 103, one or more interfaces between the control system 106 and the memory system 108, one or more interfaces between the control system 106 and the display system 110, and/or one or more interfaces between the control system 106 and one or more external device interfaces (e.g., ports or applications processors).

The interface system 104 may be configured to provide communication (which may include wired or wireless communication, electrical communication, radio communication, etc.) between components of the apparatus 101. In some such examples, the interface system 104 may be configured to provide communication between the control system 106 and the fingerprint sensor system 102. According to some such examples, the interface system 104 may couple at least a portion of the control system 106 to the fingerprint sensor system 102 and the interface system 104 may couple at least a portion of the control system 106 to the touch sensor system 103, e.g., via electrically conducting material (e.g., via conductive metal wires or traces. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)).

In some implementation, the apparatus 101 includes a display system 110. In some such examples, the display system 110 may include layers, which may be referred to collectively as a "display stack." In some examples, the display system 110 may be, or may include, a light-emitting diode (LED) display, such as an organic light-emitting diode (OLED) display.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

FIG. 2A shows an example of an active touch area and an example of an active fingerprint sensor area according to one current mobile device implementation. In this example, the apparatus is locked and in a sleep state. The apparatus 200a has a fingerprint sensor area 210a that occupies a relatively small portion of the overall touch sensor system area, which occupies most of the area of the display 220a in this example. In some examples, the fingerprint sensor area 210a may be 4 mm×9 mm or 8 mm×8 mm, whereas the area of the display 220a may be approximately 7 cm×12 cm or larger. According to this implementation the active touch area 205a during a locked and/or in a sleep state corresponds with, and is slightly larger than, the fingerprint sensor area 210a. Because the fingerprint sensor area 210a occupies a relatively small portion of the overall touch sensor system area, the power consumption caused by the active touch area 205a during the locked and sleep state may be a relatively small fraction of the power consumption caused by the touch sensor system during an unlocked and awake mode.

FIG. 2B shows an example of an active touch area and an example of an active fingerprint sensor area according to one possible future mobile device implementation that is based on the same logic underlying the example of FIG. 2A. According to this example, the apparatus 200b has been in use and, while still powered up, has reverted to a locked state and sleep state due to lack of activity within a threshold time interval. In this instance, the apparatus 200b has a fingerprint sensor area 210b that occupies most of the overall touch sensor system area. In this implementation the active touch area 205b during the locked and sleep state corresponds with, and is slightly larger than, the fingerprint sensor area 210b. Because the fingerprint sensor area 210b occupies most of the overall touch sensor system area, the power consumption caused by the active touch area 205b during the locked and sleep mode is equal to, or nearly equal to, the power consumption caused by the touch sensor system during an unlocked and awake mode.

In order to avoid the high power consumption caused by the touch sensor system in implementations such as that of FIG. 2B, some disclosed methods involve dynamically changing the size of the touch sensor system active area based, at least in part, on touch locations corresponding to the last n user touches. In some examples, the number n may be reset to zero as part of an apparatus logoff/power down process or as part of an apparatus boot-up process. A maximum value for the number n may, for example, be configurable at a factory in which the apparatus is assembled, by a device vendor, and/or by an end user.

FIGS. 3A-3I show example states of an apparatus that is configured to avoid the high power consumption caused by the touch sensor system in implementations such as that of FIG. 2B. As with other disclosed implementations, the types, numbers and arrangements of elements, as well as the dimensions of elements, that are shown in FIGS. 3A-3I are merely examples.

FIG. 3A shows an example of an apparatus that has been powered on (also referred to herein as being booted up, or as having undergone a boot-up process), but has not yet been unlocked since being powered on. According to this example, the apparatus 101 includes instances of the fingerprint sensor system 102, the touch sensor system 103, the control system 106 and the display system 110 that are described above with reference to FIG. 1. In this example, the relative proportions of the touch sensor system active area 305a and the fingerprint sensor system active area 310a are similar to those of the active touch area 205b and the fingerprint sensor area 210b that are shown in FIG. 2B. However, unlike the control system of the apparatus 200b, the control system 106 of the apparatus 101 is configured to implement some or all of the methods disclosed herein. In the example shown in FIG. 3A, the control system 106 is configured for setting the touch sensor system active area 305a to the entire touch sensor area (e.g., to all sensor cells or sensor pixels of the touch sensor system 103) upon determining that the number of last user touches since the most recent boot-up process is zero.

FIG. 3B shows an example of the apparatus of FIG. 3A after the apparatus has been unlocked one time since being powered on. According to this example, the apparatus 101 has been unlocked after the successful completion of a fingerprint authentication process that involved obtaining fingerprint sensor data from the touch location 315a, which is also referred to in FIG. 3B as a "current FP (fingerprint)

touch area." The successful fingerprint authentication process may, for example, have involved extracting fingerprint features (such as fingerprint minutiae, keypoints and/or sweat pores) from the currently-obtained fingerprint sensor data from the touch location 315a and comparing the extracted fingerprint features with fingerprint features that were previously obtained during an enrollment process.

In this example, the control system 106 determined the touch location 315a according to signals from the touch sensor system 103 that resulted from a corresponding user touch, then activated at least a portion of the fingerprint sensor system 102 to obtain fingerprint sensor data from the touch location 315a for the fingerprint authentication process.

Figures 3G, 3H, 3I:
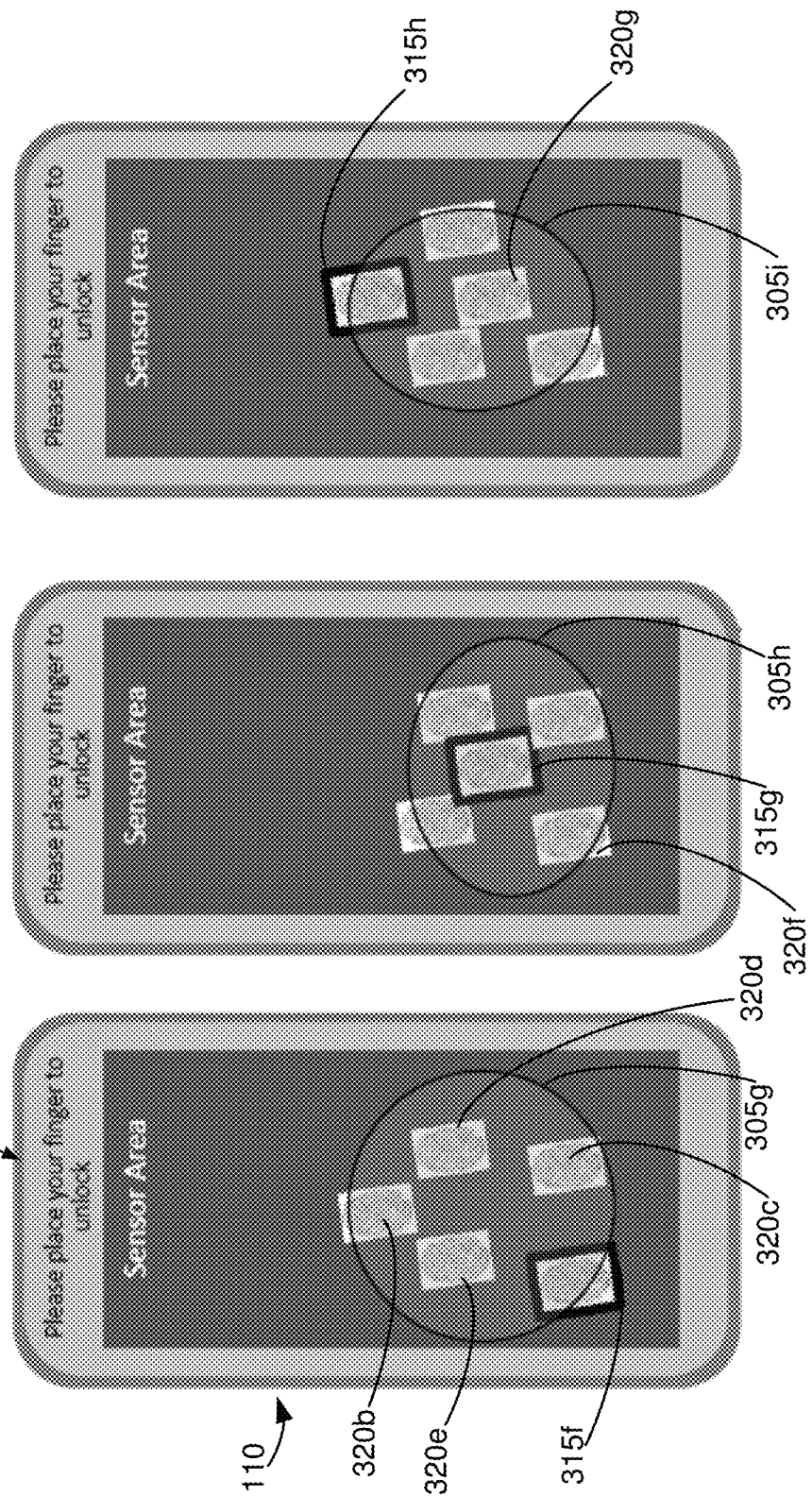

According to the example shown in FIG. 3B, the control system 106 is configured for setting the touch sensor system active area 305b to a touch sensor area that is smaller than the entire touch sensor area upon determining that the number of last user touches (in this example, the number of user touches since the time of the last boot-up process) is one. In this example, the touch sensor system active area 305b encompasses the touch location 315a and has an arcuate outline, except for the boundaries of the touch sensor system active area 305b that correspond with the edges of the entire touch sensor area. However, the specific shape and dimensions of the touch sensor system active area 305b that are shown in FIG. 3B, the specific shapes and dimensions of the touch sensor system active areas 305c-305i that are shown in FIGS. 3C-3I, and the underlying methods used to produce the shapes and dimensions of the touch sensor system active areas 305b-305i, are merely provided by way of example. Various examples of determining the shapes and dimensions of touch sensor system active areas are provided in the present disclosure.

FIG. 3C shows an example of the apparatus of FIG. 3B after the apparatus has been unlocked an additional time since being powered on. According to this example, the apparatus 101 has been unlocked after the successful completion of a second fingerprint authentication process since being powered on. Here, the second fingerprint authentication process involved obtaining fingerprint sensor data from the touch location 315b. The former touch location 320a is the penultimate touch location, corresponding to the touch location 315a of FIG. 3B. According to the example shown in FIG. 3C, the control system 106 is configured for setting the touch sensor system active area 305c to an area that is smaller than the touch sensor system active area 305b upon determining that the number n of last user touches (in this example, the number of user touches since the time of the last boot-up process) is two. In this example, the control system 106 is configured for setting the touch sensor system active area 305c to the particular size and shape indicated in FIG. 3C based on the last two user touch locations that are indicated in FIG. 3C. According to this example, the touch sensor system active area 305c encompasses the touch location 315b and the former touch location 320a, and has an elliptical shape.

FIG. 3D shows an example of the apparatus of FIG. 3C after the apparatus has been unlocked an additional time since being powered on. According to this example, the apparatus 101 has been unlocked after the successful completion of a third fingerprint authentication process since being powered on. Here, the third fingerprint authentication process involved obtaining fingerprint sensor data from the touch location 315c. The former touch location 320b is the penultimate touch location, corresponding to the touch location 315b of FIG. 3C. According to the example shown in FIG. 3D, the control system 106 is configured for setting the touch sensor system active area 305d to an area that is smaller than the touch sensor system active area 305c upon determining that the number n of last user touches (in this example, the number of user touches since the time of the last boot-up process) is three. In this example, the control system 106 is configured for setting the touch sensor system active area 305d to the particular size and shape indicated in FIG. 3D based on the last three user touch locations that are indicated in FIG. 3D: according to this example, the touch sensor system active area 305d encompasses the touch location 315c and the former touch locations 320a and 320b, and has an elliptical shape.

FIG. 3E shows an example of the apparatus of FIG. 3D after the apparatus has been unlocked an additional time since being powered on. According to this example, the apparatus 101 has been unlocked after the successful completion of a fourth fingerprint authentication process since being powered on. Here, the fourth fingerprint authentication process involved obtaining fingerprint sensor data from the touch location 315d. The former touch location 320c is the penultimate touch location, corresponding to the touch location 315c of FIG. 3D. In the example shown in FIG. 3E, the control system 106 is configured for setting the touch sensor system active area 305e to an area that is smaller than the touch sensor system active area 305d upon determining that the number n of last user touches (in this example, the number of user touches since the time of the last boot-up process) is four. In this example, the control system 106 is configured for setting the touch sensor system active area 305e to the particular size and shape indicated in FIG. 3E based on the last four user touch locations since boot-up that are indicated in FIG. 3E: according to this example, the touch sensor system active area 305e encompasses the touch location 315d and the former touch locations 320a-320c, and has an elliptical shape.

FIG. 3F shows an example of the apparatus of FIG. 3E after the apparatus has been unlocked an additional time since being powered on. According to this example, the apparatus 101 has been unlocked after the successful completion of a fifth fingerprint authentication process since being powered on. Here, the fifth fingerprint authentication process involved obtaining fingerprint sensor data from the touch location 315e. The former touch location 320d is the penultimate touch location, corresponding to the touch location 315d of FIG. 3E. In the example shown in FIG. 3F, the control system 106 is configured for setting the touch sensor system active area 305f to an area that is smaller than the touch sensor system active area 305e upon determining that the number n of last user touches (in this example, the number of user touches since the time of the last boot-up process) is five. In this example, the control system 106 is configured for setting the touch sensor system active area 305f to the particular size and shape indicated in FIG. 3F based on the last five user touch locations since boot-up that are indicated in FIG. 3F: according to this example, the touch sensor system active area 305f has an elliptical shape and encompasses the touch location 315e, the former touch locations 320a, 320b and 320d, and part but not all of the former touch location 320c.

FIG. 3G shows an example of the apparatus of FIG. 3F after the apparatus has been unlocked an additional time since being powered on. According to this example, the apparatus 101 has been unlocked after the successful completion of a sixth fingerprint authentication process since being powered on. Here, the sixth fingerprint authentication process involved obtaining fingerprint sensor data from the touch location 315*f*. The former touch location 320*e* is the penultimate touch location, corresponding to the touch location 315*e* of FIG. 3F.

According to this example, the control system 106 is configured for determining that the number of last user touches (in this example, the number of user touches since the time of the last boot-up process) has exceeded a determined maximum value for the number n, which is five in this example. Therefore, according to this example, the touch sensor system active area 305*g* is no longer based in part on the former touch location 320*a*, but instead is based only upon the last five touch locations: these include the former touch locations 320*b*-320*e* and the touch location 315*f*. In the example shown in FIG. 3G, the control system 106 is configured for setting the touch sensor system active area 305*g* to an area that is approximately the same size as, but a different shape than, the touch sensor system active area 305*f* due to the different last five touch locations at the times corresponding to FIGS. 3F and 3G. In this example, the touch sensor system active area 305*g* has an elliptical shape and is based at least in part on the last five touch locations: the touch sensor system active area 305*g* encompasses most but not all of the touch location 315*f*, the former touch locations 320*d* and 320*e*, and part but not all of the former touch locations 320*b* and 320*c*.

As noted elsewhere herein, the maximum value for the number n may be determined at different times, by different people and/or entities, depending on the particular implementation (e.g., at the factory, at a warehouse, at a retail location, at an end user location, etc.) Moreover, the maximum value for the number n may differ according to the particular implementation. In some alternative implementations the maximum value for the number n may be less than 5 (e.g., 2, 3 or 4), whereas in alternative implementations the maximum value for the number n may be more than 5 (e.g., 6, 7, 8, 9 or 10).

FIG. 3H shows an example of the apparatus of FIG. 3G after the apparatus has been unlocked an additional time since being powered on. According to this example, the apparatus 101 has been unlocked after the successful completion of a seventh fingerprint authentication process since being powered on. Here, the seventh fingerprint authentication process involved obtaining fingerprint sensor data from the touch location 315*g*. The former touch location 320*f* is the penultimate touch location, corresponding to the touch location 315*f* of FIG. 3G.

According to this example, the control system 106 is configured for determining that the number of last user touches (in this example, the number of user touches since the time of the last boot-up process) has once again exceeded a maximum value for n, which is five in this example. Therefore, according to this example, the touch sensor system active area 305*g* is no longer based in part on the former touch locations 320*a* or 320*b*, but instead is based only upon the last five touch locations: these include the former touch locations 320*c*-320*f* and the touch location 315*g*. In the example shown in FIG. 3H, the control system 106 is configured for setting the touch sensor system active area 305*h* to an area that is somewhat smaller than, and a different shape than, the touch sensor system active area 305*g* due to the different last five touch locations at the time corresponding to FIG. 3H, as compared to the last five touch locations at the time corresponding to FIG. 3G. In this example, the touch sensor system active area 305*h* has an elliptical shape and encompasses most but not all of the former touch locations 320*c*-320*f* and all of the touch location 315*g*.

FIG. 3I shows an example of the apparatus of FIG. 3H after the apparatus has been unlocked an additional time since being powered on. According to this example, the apparatus 101 has been unlocked after the successful completion of an eighth fingerprint authentication process since being powered on. Here, the eighth fingerprint authentication process involved obtaining fingerprint sensor data from the touch location 315*h*. The former touch location 320*g* is the penultimate touch location, corresponding to the touch location 315*g* of FIG. 3H.

According to this example, the control system 106 is configured for determining that the number of last user touches (in this example, the number of user touches since the time of the last boot-up process) has once again exceeded a maximum value for n, which is five in this example. Therefore, according to this example, the touch sensor system active area 305*h* is no longer based in part on the former touch locations 320*a*-320*c*, but instead is based only upon the last five touch locations: these include the former touch locations 320*d*-320*g* and the touch location 315*h*. In the example shown in FIG. 3I, the control system 106 is configured for setting the touch sensor system active area 305*i* to an area that is slightly smaller than, and a different shape than, the touch sensor system active area 305*h* due to the different last five touch locations at the time corresponding to FIG. 3I, as compared to the last five touch locations at the time corresponding to FIG. 3H. In this example, the touch sensor system active area 305*i* has an elliptical shape and encompasses the former touch locations 320*e* and 320*g*, most but not all of the former touch locations 320*d* and 320*f*, and most of the touch location 315*h*.

Figure 4:
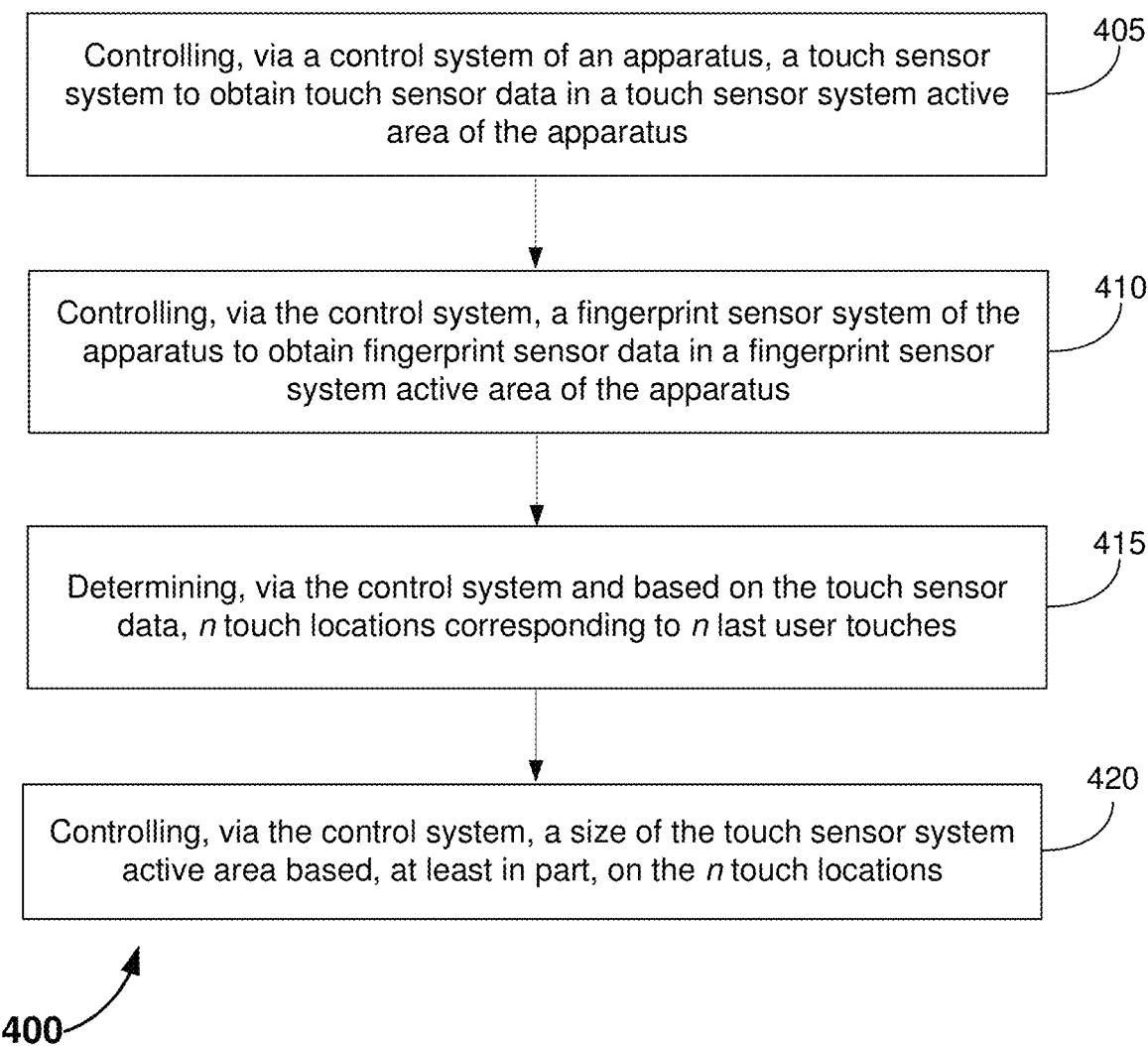
FIGS. 4 and 5 are flow diagrams that provide examples of operations according to some disclosed methods.
Figure 5:
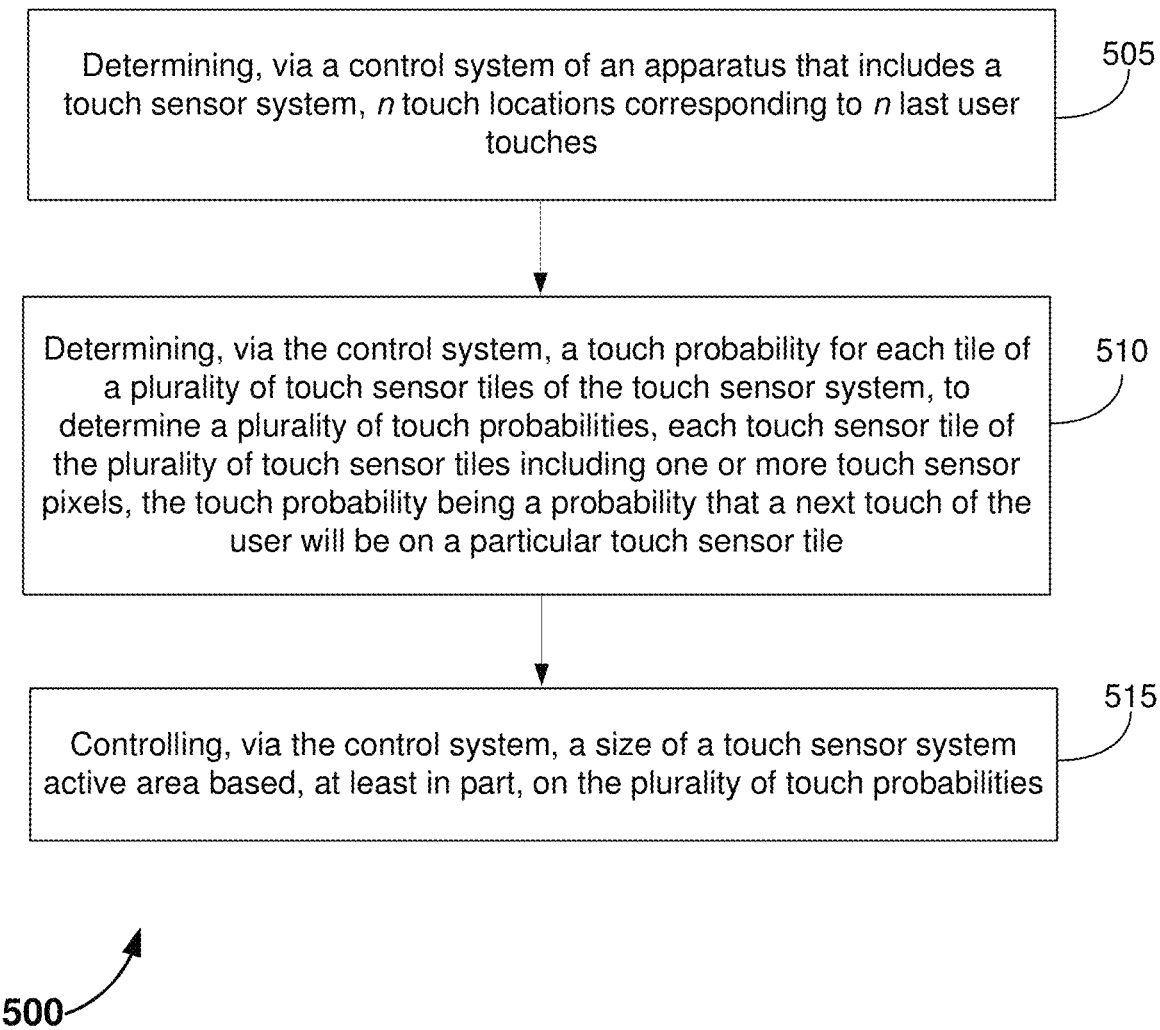

FIGS. 4 and 5 are flow diagrams that provide examples of operations according to some disclosed methods. The blocks of FIGS. 4 and 5 may, for example, be performed by the apparatus 101 of FIG. 1 or by a similar apparatus. As with other methods disclosed herein, the methods outlined in FIGS. 4 and 5 may include more or fewer blocks than indicated. Moreover, the blocks of methods disclosed herein are not necessarily performed in the order indicated. In some implementations, one or more blocks may be performed concurrently.

Referring first to FIG. 4, in this example block 405 involves controlling, via a control system of an apparatus, a touch sensor system of the apparatus to obtain touch sensor data in a touch sensor system active area of the apparatus. For example, block 405 may involve the control system 106 of FIG. 1 controlling the touch sensor system 103 to obtain touch sensor data in a touch sensor system active area of the apparatus 101.

In some instances (e.g., as described above with reference to FIGS. 3A-3I), the apparatus may be in a locked mode and/or a sleep mode at the time of receiving the touch sensor data obtained in block 405. According to some such examples, the control system may be configured to activate one or more components of the apparatus 101, such as the fingerprint sensor system 102, in response to the touch sensor data obtained in block 405.

In some examples, block 405 (or another aspect of method 400) may involve determining touch location data that corresponds with the touch sensor data obtained in block 405. In some instances, the touch location may correspond with a contact area of a target object, such as a digit, that is in contact with the touch sensor system active area. The touch location data may, in some examples, include one or more x,y coordinates of a touch sensor coordinate system. For example, the touch location data may include a plurality of coordinate pairs that define a contact area of a target object, a single coordinate pair that defines a centroid of the contact area, etc. Alternatively, or additionally, the touch location data may include one or more touch sensor pixel locations that correspond with a contact area of a target object, such as a plurality of touch sensor pixel locations that define a contact area of a target object, a single touch sensor pixel location that defines a centroid of the contact area, etc. Alternatively, or additionally, the touch location data may include one or more touch sensor tile locations that correspond with a contact area of a target object, such as a plurality of touch sensor tile locations that define a contact area of a target object, a single touch sensor tile location that defines a centroid of the contact area, etc. As described in more detail below, each touch sensor tile may include one or more touch sensor pixels. According to some such examples, block 405 (or another aspect of method 400) may involve storing the touch location data in a memory, such as a memory of the control system or a separate memory, such as a memory device of the memory system 108 of FIG. 1.

In this example, block 410 involves controlling, via the control system, a fingerprint sensor system of the apparatus to obtain fingerprint sensor data in a fingerprint sensor system active area of the apparatus. For example, block 410 may involve the control system 106 of FIG. 1 controlling the fingerprint sensor system 102 to obtain fingerprint sensor data in a fingerprint sensor system active area of the apparatus 101. In some implementations, the control system may be configured to use touch sensor data obtained in block 405 to determine the fingerprint sensor system active area. However, in some examples the fingerprint sensor system active area may include the entire fingerprint sensor system area.

According to some implementations, the fingerprint sensor data may be used for an authentication process. In some such examples, the control system may be configured to unlock the apparatus 101 if the authentication process concludes successfully.

According to this example, block 415 involves determining, via the control system and based on the touch sensor data, n touch locations corresponding to n last user touches. As described elsewhere herein, in some examples of method 400, a control system may be determined to set the value of n to zero as part of, or after, a power-down or boot-up process.

In some implementations in which n>1, block 415 may involve retrieving touch location data corresponding to former touch locations from a memory. For example, referring to FIG. 3D, n equals three. In this example, the last three touch locations since a boot-up process included the current touch location 315c and the two former touch locations 320a and 320b. In some such implementations, block 415 may involve retrieving touch location data corresponding to former touch locations 320a and 320b from a memory.

In this example, block 420 involves controlling, via the control system, a size of the touch sensor system active area based, at least in part, on the n touch locations. According to some examples, block 420 (or another aspect of method 400) may involve controlling, via the control system, a shape of the touch sensor system active area based, at least in part, on the n touch locations. For example, referring again to FIG. 3D, the last three touch locations since a boot-up process included the current touch location 315c and the two former touch locations 320a and 320b. In this example, the size and shape of the touch sensor system active area 305d are based, at least in part, on the current touch location 315c and the two former touch locations 320a and 320b. In some examples the shape of the touch sensor system active area may be arcuate or elliptical, as shown in FIGS. 3B-3I. In other examples, the shape of the touch sensor system active area may be square or rectangular, or may correspond to another geometric shape. In some examples the shape of the touch sensor system active area may correspond to an outline of touch sensor tiles that are included in the touch sensor system active area.

According to some implementations, method 400 may involve imposing a maximum value for n, which may vary according to the particular implementation. In the examples described above with reference to FIG. 3A-3I, the maximum value for n was set to five. In the example described above with reference to FIG. 3G, when the control system determined that the number of touch locations since the last boot-up process had exceeded five, only the last five touch locations were used to determine the size and shape of the touch sensor system active area 305g.

According to some examples, block 420 may involve controlling the size of the touch sensor system active area to be the entire touch sensor area upon determining that the number of last user touches since a boot-up process is zero. FIG. 3A and the corresponding description provide one such example.

In some examples, block 420 may involve controlling the size of the touch sensor system active area to be a first touch sensor area that is smaller than the entire touch sensor area upon determining that the number of last user touches since a boot-up process is one. FIG. 3B and the corresponding description provide one such example.

In some examples, block 420 may involve controlling the size of the touch sensor system active area to be a second touch sensor area that is smaller than the first touch sensor area upon determining that the number of last user touches since a boot-up process is two. FIG. 3C and the corresponding description provide one such example.

In some examples, block 420 may involve controlling the size of the touch sensor system active area to be a third touch sensor area that is smaller than the second touch sensor area upon determining that the number of last user touches since a boot-up process is three. FIG. 3D and the corresponding description provide one such example.

According to some implementations, method 400 may involve controlling the fingerprint sensor system to obtain fingerprint sensor data in each of the n touch locations. In some such examples, method 400 may involve controlling the fingerprint sensor system to obtain the fingerprint sensor data in each of the n touch locations after receiving touch sensor data corresponding to user touches in each of the n touch locations. According to some implementations, method 400 may involve controlling the fingerprint sensor system active area to correspond with each of the n touch locations after receiving the touch sensor data corresponding to user touches in each of the n touch locations. In other words, in some examples the control system 106 may be configured to obtain fingerprint sensor data only in fingerprint sensor areas that correspond with the n touch locations, without activating all sensor pixels of the fingerprint sensor system 102.

In some such implementations, method 400 may involve performing n authentication processes based on fingerprint sensor data obtained in each of the n touch locations. According to some such examples, the n touch locations only correspond to instances during which a person is placing a digit (or other target object) on the apparatus 101 in order to initiate a fingerprint-based authentication process, e.g., in an attempt to unlock the apparatus 101 after the apparatus 101 has reverted to a sleep/locked mode.

According to some implementations, method 400 may involve determining a shape that encompasses the n touch locations and setting the touch sensor system active area to correspond with the shape. FIGS. 3B-3E and the corresponding descriptions above provide relevant examples.

In some implementations, method 400 may involve determining a shape that encompasses at least a threshold portion of the n touch locations and setting the touch sensor system active area to correspond with the shape. FIGS. 3F-3I and the corresponding descriptions above provide relevant examples. In some such examples, the control system may be configured to include at least a threshold percentage of each of the last n touch locations, e.g., at least 50%, at least 60%, at least 70%, at least 80%, at least 90%, etc. In some alternative examples, the threshold may differ according to whether the touch location is the current touch location or former touch location. In some such examples, the control system may be configured to include at least a first threshold percentage of the current touch location (e.g., at least 70%, at least 80%, at least 90%, etc.) and at least a second threshold percentage of each of the last n−1 former touch locations (e.g., at least 50%, at least 60%, at least 70%, etc.). According to some examples, the threshold percentage may be higher for relatively more recent former touch locations and relatively lower for less recent former touch locations.

Referring now to FIG. 5, in this example block 505 involves determining, via a control system of an apparatus that includes a touch sensor system, n touch locations corresponding to n last user touches. As described elsewhere herein, in some examples method 500 may involve setting the value of n to zero as part of, or after, a power-down or boot-up process. In some examples, method 500 may involve setting a maximum value for n, e.g., as described above. In some examples, block 505 may correspond with block 415 of method 400 According to some such examples, blocks 510 and 515 may be regarded as specific examples of block 420. However, in some examples the method 500 is not linked to method 400. For example, in some examples the method 500 may not include block 410 or a comparable process.

According to this example, block 505 involves determining, via the control system, a touch probability for each tile of a plurality of touch sensor tiles of the touch sensor system, to determine a plurality of touch probabilities. In this example, each touch sensor tile of the plurality of touch sensor tiles includes one or more touch sensor pixels. According to this example, the touch probability is a probability that a next touch of the user will be in an area that includes a particular touch sensor tile. Greater computational efficiency may be obtained in some implementations by grouping multiple touch sensor pixels into one touch sensor tile, e.g., by grouping multiple touch sensor pixels into one square touch sensor tile having 4, 9, 16, 25, 36, 49 or 64 touch sensor pixels. Other implementations may group multiple touch sensor pixels into different shapes of touch sensor tiles, e.g., non-square rectangles or other geometric shapes.

In some examples, the touch probability for each touch sensor tile may be based on a distance from each of the n touch locations to each touch sensor tile. According to some examples, the distances may be calculated between single points that represent the locations of each touch sensor tile (e.g., a centroid of each touch sensor tile) to single points that represent the locations of each of the n touch locations (e.g., a centroid of each of the n touch locations). For example, the distances between a single point that represents the location of a single touch sensor tile to single points that represent the locations of each of the n touch locations may be calculated and averaged. The same process may be performed for all other touch sensor tiles. Some such examples may involve determining the touch probability for each touch sensor tile by implementing, via the control system, a weighted random map method. According to some such examples, a weight may be assigned to each touch sensor tile. The weight may, for example, be inversely proportional to the distance from the touch sensor tile to each of the last n touch locations, e.g., inversely proportional to the average distance from the touch sensor tile to each of the last n touch locations. Because the weight for each touch sensor tile is inversely proportional to the average distance from the touch sensor tile to each of the last n touch locations in this example, the greater the average distance the lower the weight. In some examples, the weights may be normalized in order to range from zero to one, so as to correspond with a range of probabilities ranging from a minimum of zero to a maximum of one. According to some such examples, the touch probability for each touch sensor tile may correspond to a normalized weight value.

In this example, block 515 involves controlling, via the control system, a size of a touch sensor system active area based, at least in part, on the plurality of touch probabilities. According to some such examples, block 515 may involve identifying touch sensor tiles having a touch probability greater than a touch probability threshold (e.g., 50%/0.5, 60%/0.6, 70%/0.7, 80%/0.8, 90%/0.9, etc.), to determine identified touch sensor tiles. In some examples, block 515 may involve finding an encompassing shape that will encompass at least a threshold percentage (e.g., 50%, 60%, 70%, 80%, 90%, etc.) of identified touch sensor tiles. According to some such examples, block 515 may involve determining the touch sensor system active area based on the encompassing shape.

According to some examples, block 515 may be based, at least in part, on the touch sensor system active area being a target percentage of the entire touch sensor system area. In some such examples, the target percentage may vary according to the number n of last user touches since a boot-up process. Table 1, below, shows one such example.

TABLE 1

| Value of n | Active % of Touch Sensor Area | Threshold Probability of Next Touch Being in the Active Touch Sensor Area |
|---|---|---|
| 0 | 100% | 0 |
| 1 | 90% | 0.1 |
| 2 | 80% | 0.2 |
| ... | ... | ... |
| Maximum n value | 30% | 0.8 |

As with other disclosed implementations, the particular values shown in Table 1 are merely made by way of example. Other implementations may involve other percentages and/or other probabilities. In the example shown in Table 1, if there have been no user touches since the last boot-up process (n=0), the entire touch sensor area is active. In this example, the threshold possibility corresponding to n=0 is zero, which in this context means that all touch sensor areas (e.g., touch sensor pixels or touch sensor tiles) for which a probability of receiving the next user touch is greater than zero are activated.

According to some examples, if there has been one user touch since the last boot-up process (n=1), 90% of the entire touch sensor area may be active. In this example, the threshold possibility corresponding to n=1 is 0.1, which in this context means that all touch sensor areas for which a probability of receiving the next user touch is greater than 0.1 may be activated. In some implementations, either the percentage or the probability corresponding to n=1 may be selected. For example, the percentage or the probability corresponding to n=1 that results in the larger touch sensor active area may be selected.

In some examples, if there have been two user touches since the last boot-up process (n=2), 80% of the entire touch sensor area may be active. In this example, the threshold possibility corresponding to n=2 is 0.2, which in this context means that all touch sensor areas for which a probability of receiving the next user touch is greater than 0.2 may be activated. In some implementations, either the percentage or the probability corresponding to n=2 may be selected. For example, the percentage or the probability corresponding to n=2 that results in the larger touch sensor active area may be selected.

In the example shown in Table 1, a maximum value of n can be specified and implemented. According to this example, if there have been a maximum n value of user touches since the last boot-up process (e.g., n=5), 30% of the entire touch sensor area may be active. In this example, the threshold possibility corresponding to a maximum n value is 0.8, which in this context means that all touch sensor areas for which a probability of receiving the next user touch is greater than 0.8 may be activated. In some implementations, either the percentage or the probability corresponding to the maximum n value may be selected. For example, the percentage or the probability corresponding to the maximum n value that results in the larger touch sensor active area may be selected.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Implementation examples are described in the following numbered clauses:

1. An apparatus, comprising:
a touch sensor system;
a fingerprint sensor system; and
a control system configured for communication with the touch sensor system and the fingerprint sensor system, the control system being further configured for:
controlling the touch sensor system to obtain touch sensor data in a touch sensor system active area of the apparatus;
controlling the fingerprint sensor system to obtain fingerprint sensor data in a fingerprint sensor system active area of the apparatus;
determining, based on the touch sensor data, n touch locations corresponding to n last user touches; and
controlling a size of the touch sensor system active area based, at least in part, on the n touch locations.

2. The apparatus of clause 1, wherein the control system is further configured for setting a number of last user touches to zero after an apparatus boot-up process.

3. The apparatus of clause 2, wherein the control system is further configured for setting the touch sensor system active area to an entire touch sensor area upon determining that the number of last user touches is zero.

4. The apparatus of clause 3, wherein the control system is further configured for setting the touch sensor system active area to a first touch sensor area that is smaller than the entire touch sensor area upon determining that the number of last user touches is one.

5. The apparatus of clause 4, wherein the control system is further configured for setting the touch sensor system active area to a second touch sensor area that is smaller than the first touch sensor area upon determining that the number of last user touches is two.

6. The apparatus of clause 5, wherein the control system is further configured for setting the touch sensor system active area to a third touch sensor area that is smaller than the second touch sensor area upon determining that the number of last user touches is three.

7. The apparatus of any one of clauses 1-6, wherein the control system is further configured for:
determining a shape that encompasses the n touch locations; and
setting the touch sensor system active area to correspond with the shape.

8. The apparatus of any one of clauses 1-6, wherein the control system is further configured for:
determining a shape that encompasses at least a threshold portion of the n touch locations; and
setting the touch sensor system active area to correspond with the shape.

9. The apparatus of any one of clauses 1-8, wherein the control system is further configured for:
determining a touch probability for each tile of a plurality of touch sensor tiles of the touch sensor system, to determine a plurality of touch probabilities, each touch sensor tile of the plurality of touch sensor tiles including one or more touch sensor pixels, the touch probability being a probability that a next user touch will be on a particular touch sensor tile; and
controlling the size of the touch sensor system active area based, at least in part, on the plurality of touch probabilities.

10. The apparatus of clause 9, wherein the touch probability for each touch sensor tile is based on a distance from each of the n touch locations to each touch sensor tile.

11. The apparatus of clause 10, wherein the control system is further configured for:
identifying touch sensor tiles having a touch probability greater than a touch probability threshold, to determine identified touch sensor tiles;
finding an encompassing shape that will encompass at least a threshold percentage of identified touch sensor tiles; and
determining the touch sensor system active area based on the encompassing shape.

12. The apparatus of any one of clauses 1-11, wherein the control system is further configured for controlling the fingerprint sensor system to obtain fingerprint sensor data in each of the n touch locations.

13. The apparatus of clause 12, wherein the control system is further configured for controlling the fingerprint sensor system to obtain the fingerprint sensor data in each of the n touch locations after receiving touch sensor data corresponding to user touches in each of the n touch locations.

14. The apparatus of clause 13, wherein the control system is further configured for controlling the fingerprint sensor system active area to correspond with each of the n touch locations after receiving the touch sensor data corresponding to user touches in each of the n touch locations.

15. A method, comprising:
controlling, via a control system of an apparatus, a touch sensor system of the apparatus to obtain touch sensor data in a touch sensor system active area of the apparatus;
controlling, via the control system, a fingerprint sensor system of the apparatus to obtain fingerprint sensor data in a fingerprint sensor system active area of the apparatus;
determining, via the control system and based on the touch sensor data, n touch locations corresponding to n last user touches; and
controlling, via the control system, a size of the touch sensor system active area based, at least in part, on the n touch locations.

16. The method of clause 15, further comprising setting a number of last user touches to zero after an apparatus boot-up process.

17. The method of clause 16, further comprising setting the touch sensor system active area to an entire touch sensor area upon determining that the number of last user touches is zero.

18. The method of clause 17, further comprising setting the touch sensor system active area to a first touch sensor area that is smaller than the entire touch sensor area upon determining that the number of last user touches is one.

19. The method of clause 18, further comprising setting the touch sensor system active area to a second touch sensor area that is smaller than the first touch sensor area upon determining that the number of last user touches is two.

20. The method of clause 19, further comprising setting the touch sensor system active area to a third touch sensor area that is smaller than the second touch sensor area upon determining that the number of last user touches is three.

21. The method of any one of clauses 15-20, further comprising:
determining a shape that encompasses the n touch locations; and
setting the touch sensor system active area to correspond with the shape.

22. The method of any one of clauses 15-20, further comprising:
determining a shape that encompasses at least a threshold portion of the n touch locations; and
setting the touch sensor system active area to correspond with the shape.

23. The method of any one of clauses 15-22, further comprising:
determining a touch probability for each tile of a plurality of touch sensor tiles of the touch sensor system, to determine a plurality of touch probabilities, each touch sensor tile of the plurality of touch sensor tiles including one or more touch sensor pixels, the touch probability being a probability that a next user touch will be on a particular touch sensor tile; and
controlling the size of the touch sensor system active area based, at least in part, on the plurality of touch probabilities.

24. The method of clause 23, wherein the touch probability for each touch sensor tile is based on a distance from each of the n touch locations to each touch sensor tile.

25. The method of clause 24, further comprising:
identifying touch sensor tiles having a touch probability greater than a touch probability threshold, to determine identified touch sensor tiles;
finding an encompassing shape that will encompass at least a threshold percentage of identified touch sensor tiles; and
determining the touch sensor system active area based on the encompassing shape.

26. The method of any one of clauses 15-25, further comprising controlling the fingerprint sensor system to obtain fingerprint sensor data in each of the n touch locations.

27. The method of clause 26, further comprising controlling the fingerprint sensor system to obtain the fingerprint sensor data in each of the n touch locations after receiving touch sensor data corresponding to user touches in each of the n touch locations.

28. The method of clause 27, further comprising controlling the fingerprint sensor system active area to correspond with each of the n touch locations after receiving the touch sensor data corresponding to user touches in each of the n touch locations.

29. One or more non-transitory media having software stored thereon, the software including instructions for controlling one or more devices to perform a method, the method comprising:
controlling, via a control system of an apparatus, a touch sensor system of the apparatus to obtain touch sensor data in a touch sensor system active area of the apparatus;
controlling, via the control system, a fingerprint sensor system of the apparatus to obtain fingerprint sensor data in a fingerprint sensor system active area of the apparatus;
determining, via the control system and based on the touch sensor data, n touch locations corresponding to n last user touches; and
controlling, via the control system, a size of the touch sensor system active area based, at least in part, on the n touch locations.

30. The one or more non-transitory media of clause 29, wherein the method further comprises setting a number of last user touches to zero after an apparatus boot-up process.

31. The one or more non-transitory media of clause 30, wherein the method further comprises setting the touch sensor system active area to an entire touch sensor area upon determining that the number of last user touches is zero.

32. The one or more non-transitory media of clause 31, wherein the method further comprises setting the touch sensor system active area to a first touch sensor area that is smaller than the entire touch sensor area upon determining that the number of last user touches is one.

33. The one or more non-transitory media of clause 32, wherein the method further comprises setting the touch sensor system active area to a second touch sensor area that is smaller than the first touch sensor area upon determining that the number of last user touches is two.

34. The one or more non-transitory media of clause 33, wherein the method further comprises setting the touch sensor system active area to a third touch sensor area that is smaller than the second touch sensor area upon determining that the number of last user touches is three.

35. The one or more non-transitory media of any one of clauses 29-34, wherein the method further comprises:
determining a shape that encompasses the n touch locations; and
setting the touch sensor system active area to correspond with the shape.

36. The one or more non-transitory media of any one of clauses 29-34, wherein the method further comprises:
determining a shape that encompasses at least a threshold portion of the n touch locations; and
setting the touch sensor system active area to correspond with the shape.

37. An apparatus, comprising:
a touch sensor system;
a fingerprint sensor system; and
control means for:
controlling the touch sensor system to obtain touch sensor data in a touch sensor system active area of the apparatus;
controlling the fingerprint sensor system to obtain fingerprint sensor data in a fingerprint sensor system active area of the apparatus;
determining, based on the touch sensor data, n touch locations corresponding to n last user touches; and
controlling a size of the touch sensor system active area based, at least in part, on the n touch locations.

38. The apparatus of clause 37, wherein the control means includes means for setting a number of last user touches to zero after an apparatus boot-up process.

39. The apparatus of clause 38 wherein the control means includes means for setting the touch sensor system active area to an entire touch sensor area upon determining that the number of last user touches is zero.

40. The apparatus of clause 39, wherein the control means includes means for setting the touch sensor system active area to a first touch sensor area that is smaller than the entire touch sensor area upon determining that the number of last user touches is one.

41. The apparatus of clause 40, wherein the control means includes means for setting the touch sensor system active area to a second touch sensor area that is smaller than the first touch sensor area upon determining that the number of last user touches is two.

The invention claimed is:

1. An apparatus, comprising:
a touch sensor system;
a fingerprint sensor system; and
a control system configured for communication with the touch sensor system and the fingerprint sensor system, the control system being further configured for:
controlling the touch sensor system to obtain touch sensor data in a touch sensor system active area of the apparatus;
controlling the fingerprint sensor system to obtain fingerprint sensor data in a fingerprint sensor system active area of the apparatus;
determining, based on the touch sensor data, n touch locations corresponding to n last user touches, n being an integer equal to two or more;
determining a touch probability for each tile of a plurality of touch sensor tiles of the touch sensor system, to determine a plurality of touch probabilities, each touch sensor tile of the plurality of touch sensor tiles including one or more touch sensor pixels, the touch probability being a probability that a next user touch will be on a particular touch sensor tile; and
controlling a size of the touch sensor system active area based, at least in part, on the n touch locations and the plurality of touch probabilities.

2. The apparatus of claim 1, wherein the control system is further configured for setting a number of last user touches to zero after an apparatus boot-up process.

3. The apparatus of claim 2, wherein the control system is further configured for setting the touch sensor system active area to an entire touch sensor area upon determining that the number of last user touches is zero.

4. The apparatus of claim 3, wherein the control system is further configured for setting the touch sensor system active area to a first touch sensor area that is smaller than the entire touch sensor area upon determining that the number of last user touches is one.

5. The apparatus of claim 4, wherein the control system is further configured for setting the touch sensor system active area to a second touch sensor area that is smaller than the first touch sensor area upon determining that the number of last user touches is two.

6. The apparatus of claim 5, wherein the control system is further configured for setting the touch sensor system active area to a third touch sensor area that is smaller than the second touch sensor area upon determining that the number of last user touches is three.

7. The apparatus of claim 1, wherein the control system is further configured for:
determining a shape that encompasses the n touch locations; and
setting the touch sensor system active area to correspond with the shape.

8. The apparatus of claim 1, wherein the control system is further configured for:
determining a shape that encompasses at least a threshold portion of the n touch locations; and
setting the touch sensor system active area to correspond with the shape.

9. The apparatus of claim 1, wherein the touch probability for each touch sensor tile is based on a distance from each of the n touch locations to each touch sensor tile.

10. The apparatus of claim 9, wherein the control system is further configured for:
identifying touch sensor tiles having a touch probability greater than a touch probability threshold, to determine identified touch sensor tiles;
finding an encompassing shape that will encompass at least a threshold percentage of identified touch sensor tiles; and
determining the touch sensor system active area based on the encompassing shape.

11. The apparatus of claim 1, wherein the control system is further configured for controlling the fingerprint sensor system to obtain fingerprint sensor data in each of the n touch locations.

12. The apparatus of claim 11, wherein the control system is further configured for controlling the fingerprint sensor system to obtain the fingerprint sensor data in each of the n touch locations after receiving touch sensor data corresponding to user touches in each of the n touch locations.

13. The apparatus of claim 12, wherein the control system is further configured for controlling the fingerprint sensor system active area to correspond with each of the n touch locations after receiving the touch sensor data corresponding to user touches in each of the n touch locations.

14. A method, comprising:
controlling, via a control system of an apparatus, a touch sensor system of the apparatus to obtain touch sensor data in a touch sensor system active area of the apparatus;
controlling, via the control system, a fingerprint sensor system of the apparatus to obtain fingerprint sensor data in a fingerprint sensor system active area of the apparatus;
determining, via the control system and based on the touch sensor data, n touch locations corresponding to n last user touches, n being an integer equal to two or more;
determining a touch probability for each tile of a plurality of touch sensor tiles of the touch sensor system, to determine a plurality of touch probabilities, each touch sensor tile of the plurality of touch sensor tiles including one or more touch sensor pixels, the touch probability being a probability that a next user touch will be on a particular touch sensor tile; and
controlling, via the control system, a size of the touch sensor system active area based, at least in part, on the n touch locations and the plurality of touch probabilities.

15. The method of claim 14, further comprising setting a number of last user touches to zero after an apparatus boot-up process.

16. The method of claim 15, further comprising setting the touch sensor system active area to an entire touch sensor area upon determining that the number of last user touches is zero.

17. The method of claim 16, further comprising setting the touch sensor system active area to a first touch sensor area that is smaller than the entire touch sensor area upon determining that the number of last user touches is one.

18. The method of claim 17, further comprising setting the touch sensor system active area to a second touch sensor area that is smaller than the first touch sensor area upon determining that the number of last user touches is two.

19. The method of claim 18, further comprising setting the touch sensor system active area to a third touch sensor area that is smaller than the second touch sensor area upon determining that the number of last user touches is three.

20. The method of claim 14, further comprising:
determining a shape that encompasses the n touch locations; and
setting the touch sensor system active area to correspond with the shape.

21. The method of claim 14, further comprising:
determining a shape that encompasses at least a threshold portion of the n touch locations; and
setting the touch sensor system active area to correspond with the shape.

22. The method of claim 14, wherein the touch probability for each touch sensor tile is based on a distance from each of the n touch locations to each touch sensor tile.

23. The method of claim 22, further comprising:
identifying touch sensor tiles having a touch probability greater than a touch probability threshold, to determine identified touch sensor tiles;
finding an encompassing shape that will encompass at least a threshold percentage of identified touch sensor tiles; and
determining the touch sensor system active area based on the encompassing shape.

24. The method of claim 14, further comprising controlling the fingerprint sensor system to obtain fingerprint sensor data in each of the n touch locations.

25. The method of claim 24, further comprising controlling the fingerprint sensor system to obtain the fingerprint sensor data in each of the n touch locations after receiving touch sensor data corresponding to user touches in each of the n touch locations.

26. The method of claim 25, further comprising controlling the fingerprint sensor system active area to correspond with each of the n touch locations after receiving the touch sensor data corresponding to user touches in each of the n touch locations.

27. One or more non-transitory media having software stored thereon, the software including instructions for controlling one or more devices to perform a method, the method comprising:
controlling, via a control system of an apparatus, a touch sensor system of the apparatus to obtain touch sensor data in a touch sensor system active area of the apparatus;
controlling, via the control system, a fingerprint sensor system of the apparatus to obtain fingerprint sensor data in a fingerprint sensor system active area of the apparatus;
determining, via the control system and based on the touch sensor data, n touch locations corresponding to n last user touches, n being an integer equal to two or more;
determining a touch probability for each tile of a plurality of touch sensor tiles of the touch sensor system, to determine a plurality of touch probabilities, each touch sensor tile of the plurality of touch sensor tiles including one or more touch sensor pixels, the touch probability being a probability that a next user touch will be on a particular touch sensor tile; and
controlling, via the control system, a size of the touch sensor system active area based, at least in part, on the n touch locations and the plurality of touch probabilities.

28. The one or more non-transitory media of claim 27, wherein the method further comprises setting a number of last user touches to zero after an apparatus boot-up process.

29. The one or more non-transitory media of claim 28, wherein the method further comprises setting the touch sensor system active area to an entire touch sensor area upon determining that the number of last user touches is zero.

30. The one or more non-transitory media of claim 29, wherein the method further comprises setting the touch sensor system active area to a first touch sensor area that is smaller than the entire touch sensor area upon determining that the number of last user touches is one.

31. The one or more non-transitory media of claim 30, wherein the method further comprises setting the touch sensor system active area to a second touch sensor area that is smaller than the first touch sensor area upon determining that the number of last user touches is two.

32. The one or more non-transitory media of claim 31, wherein the method further comprises setting the touch sensor system active area to a third touch sensor area that is smaller than the second touch sensor area upon determining that the number of last user touches is three.

33. The one or more non-transitory media of claim 27, wherein the method further comprises:
determining a shape that encompasses the n touch locations; and
setting the touch sensor system active area to correspond with the shape.

34. The one or more non-transitory media of claim 27, wherein the method further comprises:
determining a shape that encompasses at least a threshold portion of the n touch locations; and
setting the touch sensor system active area to correspond with the shape.

35. An apparatus, comprising:
a touch sensor system;
a fingerprint sensor system; and
control means for:
controlling the touch sensor system to obtain touch sensor data in a touch sensor system active area of the apparatus;
controlling the fingerprint sensor system to obtain fingerprint sensor data in a fingerprint sensor system active area of the apparatus;
determining, based on the touch sensor data, n touch locations corresponding to n last user touches, n being an integer equal to two or more;
determining a touch probability for each tile of a plurality of touch sensor tiles of the touch sensor system, to determine a plurality of touch probabilities, each touch sensor tile of the plurality of touch sensor tiles including one or more touch sensor pixels, the touch probability being a probability that a next user touch will be on a particular touch sensor tile; and controlling a size of the touch sensor system active area based, at least in part, on the n touch locations and the plurality of touch probabilities.

36. The apparatus of claim 35, wherein the control means includes means for setting a number of last user touches to zero after an apparatus boot-up process.

37. The apparatus of claim 36, wherein the control means includes means for setting the touch sensor system active area to an entire touch sensor area upon determining that the number of last user touches is zero.

38. The apparatus of claim 37, wherein the control means includes means for setting the touch sensor system active area to a first touch sensor area that is smaller than the entire touch sensor area upon determining that the number of last user touches is one.

39. The apparatus of claim 38, wherein the control means includes means for setting the touch sensor system active area to a second touch sensor area that is smaller than the first touch sensor area upon determining that the number of last user touches is two.

\* \* \* \* \*